US008671659B2

(12) United States Patent
ELKady et al.

(10) Patent No.: US 8,671,659 B2
(45) Date of Patent: Mar. 18, 2014

(54) SYSTEMS AND METHODS FOR POWER GENERATION USING OXY-FUEL COMBUSTION

(75) Inventors: Ahmed Mostafa ELKady, Guilderland, NY (US); Uyigue Omoma Idahosa, Saratoga Springs, NY (US); Matthew Patrick Boespflug, Clifton Park, NY (US); Grover Andrew Bennett, Schenectady, NY (US); John Thomas Herbon, Loveland, OH (US); Hasan Karim, Simpsonville, SC (US); Geoffrey David Myers, Simpsonville, SC (US); Seyed Gholamali Saddoughi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 342 days.

(21) Appl. No.: 13/097,132

(22) Filed: Apr. 29, 2011

(65) Prior Publication Data

US 2012/0272655 A1 Nov. 1, 2012

(51) Int. Cl.
*B63H 11/00* (2006.01)
*B64G 1/40* (2006.01)
*B64G 99/00* (2009.01)

(52) U.S. Cl.
USPC .................. 60/204; 60/202; 60/200.1

(58) Field of Classification Search
USPC ........................... 60/202, 204, 200.1
See application file for complete search history.

(56) References Cited

U.S. PATENT DOCUMENTS

| | | | |
|---|---|---|---|
| 4,092,825 A * | 6/1978 | Egan | 60/781 |
| 4,519,453 A | 5/1985 | Riddiford | |
| 5,845,480 A | 12/1998 | DeFreitas et al. | |
| 6,302,682 B1 | 10/2001 | Early et al. | |
| 6,673,848 B2 * | 1/2004 | Bon | 521/148 |
| 6,871,502 B2 | 3/2005 | Marin et al. | |
| 7,320,288 B2 * | 1/2008 | Marin et al. | 110/345 |
| 7,648,785 B2 * | 1/2010 | Hu et al. | 429/412 |
| 7,739,864 B2 | 6/2010 | Finkenrath et al. | |
| 7,827,778 B2 * | 11/2010 | Finkenrath et al. | 60/39.52 |
| 2006/0063046 A1 * | 3/2006 | Hu et al. | 429/17 |
| 2009/0165436 A1 | 7/2009 | Herbon et al. | |
| 2010/0077941 A1 | 4/2010 | D'Agostini | |
| 2013/0133305 A1 * | 5/2013 | Depuy | 60/39.12 |

* cited by examiner

Primary Examiner — Phutthiwat Wongwian
Assistant Examiner — Craig Kim
(74) Attorney, Agent, or Firm — Francis T. Coppa

(57) ABSTRACT

A system and a method of generating energy in a power plant using a turbine are provided. The system includes an air separation unit providing an oxygen output; a plasma generator that is capable of generating plasma; and a combustor configured to receive oxygen and to combust a fuel stream in the presence of the plasma, so as to maintain a stable flame, generating an exhaust gas. The system can further include a water condensation system, fluidly-coupled to the combustor, that is capable of producing a high-content carbon dioxide stream that is substantially free of oxygen. The method of generating energy in a power plant includes the steps of operating an air separation unit to separate oxygen from air, combusting a fuel stream in a combustor in the presence of oxygen, and generating an exhaust gas from the combustion. The exhaust gas can be used in a turbine to generate electricity. A plasma is generated inside the combustor, and a stable flame is maintained in the combustor.

7 Claims, 10 Drawing Sheets

SYSTEMS AND METHODS FOR POWER GENERATION USING OXY-FUEL COMBUSTION

BACKGROUND

The invention relates generally to systems and methods for power generation, using oxy-fuel combustion. More particularly, the invention relates to gas-turbines that include plasma generators for enhanced flame stability.

Exhaust streams generated by the combustion of fossil fuels in, for example, power generation systems, contain nitrogen oxides ($NO_x$) and carbon monoxide (CO) as byproducts during combustion. $NO_x$ and CO emissions from power plants utilizing fossil fuels are increasingly penalized by national and international regulations. With increasing costs for emitting $NO_x$ and CO, emission reduction is important for economic power generation.

One method of reducing $NO_x$ emissions is to remove $NO_x$ from the exhaust gas through selective catalytic reduction. A method for achieving near zero $NO_x$, without the need for removal of $NO_x$ from the exhaust, is the oxy-fuel combustion process. In this method, pure oxygen (typically in combination with a secondary gas such as $CO_2$) is used as the oxidizer, as opposed to using air, thereby resulting in a flue gas with negligible $NO_x$ emissions. In the oxy-fuel process, a lower exhaust CO emission can be produced when a combustion flame can be stabilized with the lowest possible $O_2$ concentrations in the oxidizer. The minimized $O_2$ oxidizer further results in lower $O_2$ content in the exhaust stream. In addition, operating the combustion process close to a stoichiometric fuel-to-oxygen ratio ($\phi=1$), or with a slightly richer fuel, minimizes the $O_2$ content in the exhaust, enabling high $CO_2$ concentrations for downstream processes. However, the reduction in oxy-fuel $O_2$ concentration below a certain level may lead to flame stability issues.

Therefore, there is a need for a system and method for power generation that ensures lower levels of $NO_x$ and CO emissions, along with maintaining flame stability.

BRIEF DESCRIPTION

Briefly, in one embodiment, a system is provided. The system includes an air separation unit providing an oxygen output; a plasma generator that is capable of generating plasma; and a combustor configured to receive oxygen and to combust a fuel stream in the presence of the plasma, so as to maintain a stable flame, generating an exhaust gas. The system further includes a water condensation system, fluidly-coupled to the combustor. The water condensation system is capable of producing a high-content carbon dioxide stream that is substantially free of oxygen.

In some embodiments, the system includes a compressor configured to compress air or oxygen; an air separation unit providing an oxygen output; a plasma generator that is capable of generating plasma; and a combustor configured to receive compressed oxygen and to combust a fuel stream in the presence of the plasma, so as to maintain a stable flame, generating an exhaust gas. The system can further include a turbine for receiving the exhaust gas from the combustor to generate electricity; and a water condensation system, fluidly-coupled to the turbine. The water condensation system is capable of producing a high-content carbon dioxide stream that is substantially free of oxygen.

In another embodiment, a method of generating energy in a power plant is provided. The method includes the steps of operating an air separation unit to separate oxygen from air, combusting a fuel stream in a combustor in the presence of oxygen, generating an exhaust gas from the combustion, wherein the exhaust gas comprises carbon dioxide and water, operating a turbine to generate electricity using the exhaust gas, condensing water out of the exhaust gas, after the exhaust gas is used to generate the electricity, so as to obtain a high-content carbon dioxide stream that is substantially free of oxygen, directing at least a portion of the carbon dioxide stream to the combustor, generating plasma inside the combustor using a plasma generator, and maintaining a stable flame in the combustor at a carbon dioxide level of greater than about 70% of the resulting oxidizer composition by volume in the presence of the plasma, by adjusting the carbon dioxide feed-rate and the power level of the plasma.

DRAWINGS

These and other features, aspects, and advantages of the present invention will become better understood when the following detailed description is read with reference to the accompanying drawings in which like characters represent like parts throughout the drawings, wherein:

FIG. 1 illustrates a turbine system, according to an embodiment of the invention;

FIG. 2 compares the equilibrium flame temperatures for a number of gas mixtures;

DETAILED DESCRIPTION

Embodiments of the present invention include oxy-fuel combustion along with the application of plasma power.

In the following specification and the claims that follow, the singular forms "a", "an" and "the" include plural referents unless the context clearly dictates otherwise.

Oxy-fuel combustion in gas turbine applications is one of the main routes for zero NOx emissions combustion. Oxy-fuel combustion is an enabler for $CO_2$ capture and sequestration, and is an attractive technology for applications requiring $CO_2$ without oxygen contamination. In gas turbines that operate by way of an oxy-fuel process, a $CO_2$ separation unit is not needed, because the main component of combustion exhaust includes primarily $CO_2$, and $H_2O$. By condensing $H_2O$ or using the exhaust stream in a heat recovery steam generation (HRSG) process, a high concentration stream of $CO_2$ is produced and can be used for $CO_2$ sequestration or other $CO_2$ applications.

Figure 1:
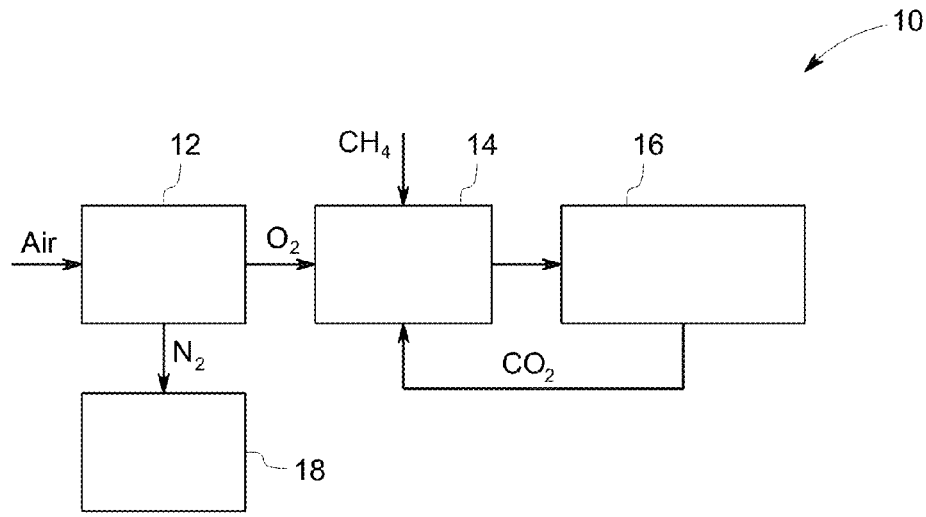

In general, a system 10 includes mainly an air separation unit (ASU) 12, a combustor 14, and a cooling system 16, as depicted in FIG. 1. The ASU 12 separates oxygen from air, providing a supply of oxygen as an oxidizer to the combustor 14. The combustor 14 is configured to burn fuel in the presence of oxygen that is directed to the combustor 14, either separately or after mixing with $CO_2$. Nitrogen from the ASU 12 can be stored in a reservoir management unit 18 and/or used for other applications, such as, for example, recovering natural gas from gas fields. Products of combustion normally contain mainly $CO_2$, $H_2O$ and trace emissions of CO and $O_2$. The cooling system 16 condenses $H_2O$, resulting in exhaust gases exceeding 95% $CO_2$ composition. The efficiency of the oxy-fuel combustion process of FIG. 1 depends on the $O_2$ delivered by the ASU 12. An enhanced demand of oxygen from an ASU 12 may result in increasing process costs, due to the relatively expensive ASU 12 systems. Therefore, it will be of interest to determine the minimum level of oxygen required for stable oxy-fuel combustion.

In one embodiment, a reduction of exhaust $O_2$ is desirable for applications that require a high-content $CO_2$ stream that is substantially free of oxygen. As used herein, a "high-content $CO_2$ stream" is defined as a stream having more than about 80% by volume of $CO_2$. In another embodiment, a high-content $CO_2$ stream contains more than about 90% by volume of $CO_2$. In a further embodiment, the high-content $CO_2$ stream contains more than about 95% by volume of $CO_2$. A stream "substantially free of oxygen" can be defined as a stream containing less than about 1% by volume of oxygen. In one embodiment, an oxygen level of less than 10 ppm in the $CO_2$ exhaust stream is desirable. One example of an application requiring a high-content $CO_2$ stream is oil recovery from depleted oil recovery wells, where the $CO_2$ stream injection could lead to enhanced oil recovery. A portion of the high $CO_2$ exhaust gases may also be recirculated to the combustor 14, for mixing with the separated $O_2$ from the ASU 12. Maintaining minimum CO emissions from the combustion helps in maintaining high combustion efficiency.

Based on equilibrium calculations and experimental work by the inventors, lower exhaust $O_2$ and CO emissions can occur when a combustion flame can be stabilized with lower $O_2$ concentrations in the oxidizer. One way of maintaining a lower oxygen concentration is by using a mixture of oxygen and $CO_2$ as an oxidizer. However, increasing $CO_2$ concentrations and lowering $O_2$ in the oxidizer below a certain level may reduce flame stability.

Figure 2:
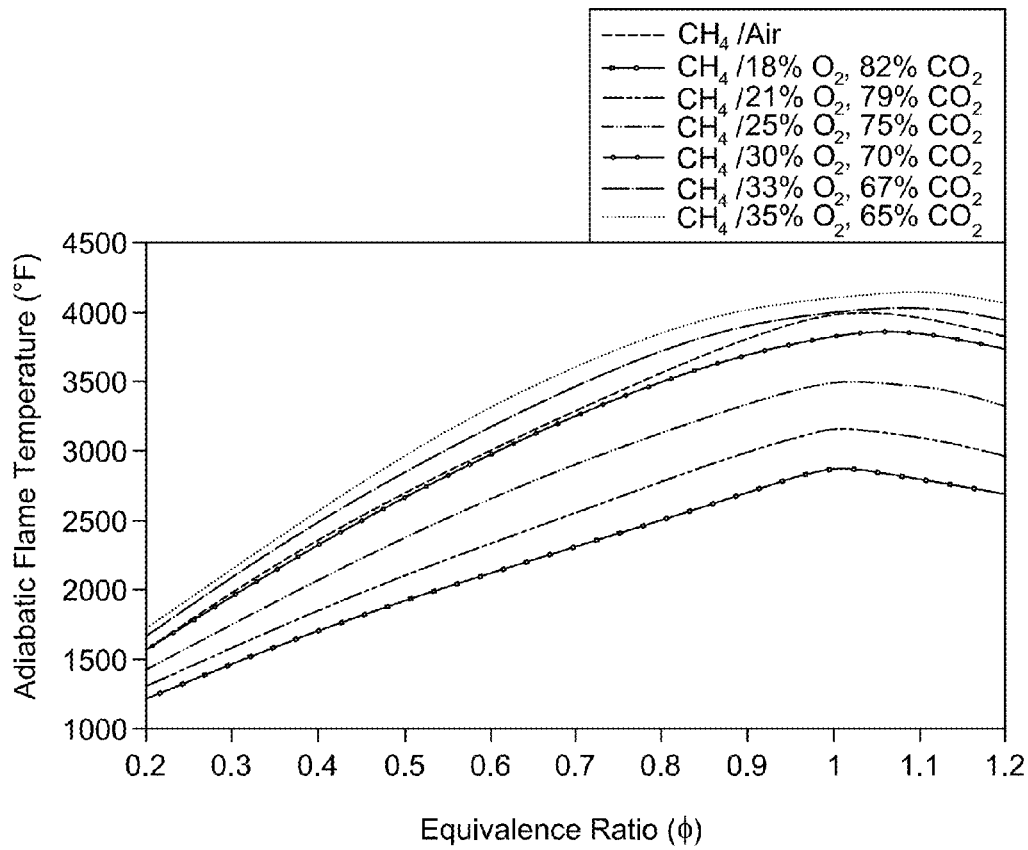

Previous equilibrium calculations and screen tests conducted by the inventors on combustion using $CH_4$ as a fuel have indicated that oxidizer levels of about 30% $O_2$ by volume in the oxy-fuel combustion are required to match flame temperatures for $CH_4$-air combustion. Some equilibrium curves for varying oxidizer $O_2$ levels are compared with the $CH_4$-air curve, as illustrated in FIG. 2.

In the present application, the inventors typically used plasma assisted oxy-fuel combustion as an enabler for wider flame stability at lower $O_2$ concentrations. $NO_x$ production in a plasma assisted combustion using an oxy-fuel is expected to be minimal, as nitrogen is present in very low concentrations in the oxygen supplied by the ASU. Experiments from the inventors showed that up to about 4% nitrogen in the oxidizer does not generate more than about 5 ppm of $NO_x$.

Figure 3:
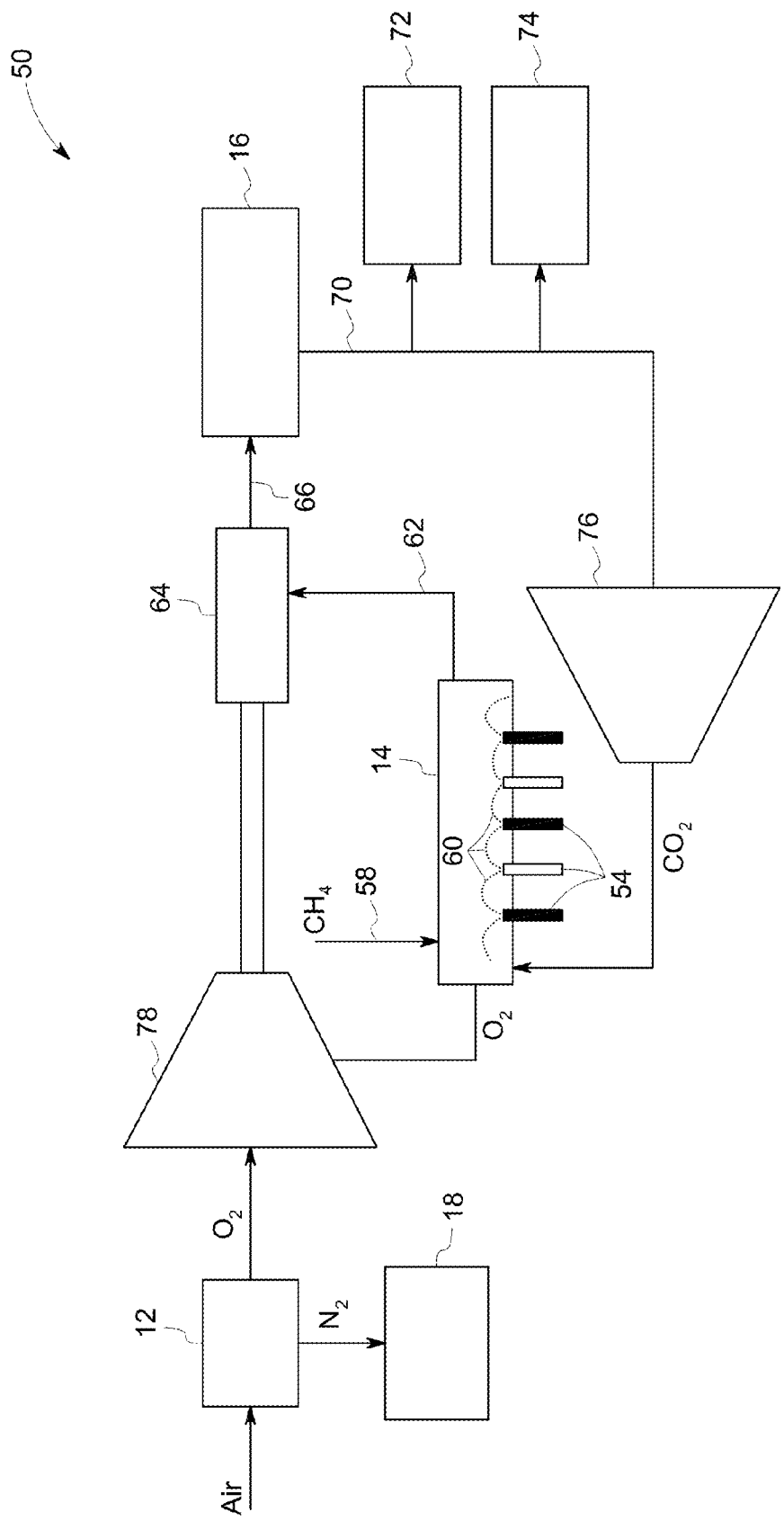
FIG. 3 illustrates a turbine system, according to another embodiment of the invention.
Figure 4:
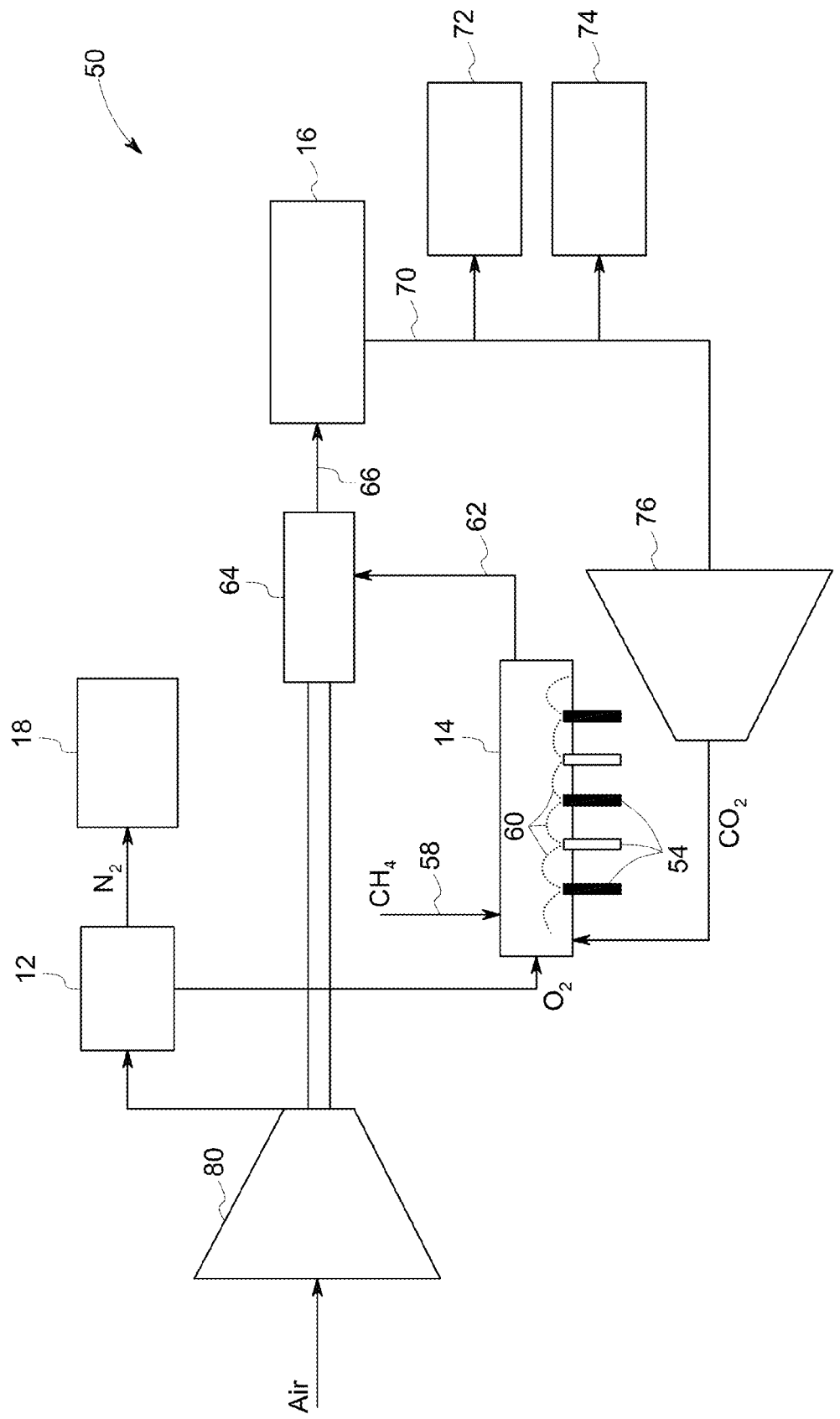
FIG. 4 illustrates a turbine system, according to another embodiment of the invention.

Thus, in one embodiment, a system 50 is provided, as shown in FIG. 3 and FIG. 4. The system 50 includes an ASU 12 providing oxygen output; a plasma generator 54 that is capable of generating plasma; and a combustor 14 configured to receive oxygen and to combust a fuel stream 58 in the presence of the plasma 60, so as to maintain a stable flame (not shown) generating an exhaust gas 62. (Those skilled in the art understand that other techniques for providing oxygen could be used, in place of the ASU).

The concept of a "stable flame" is generally known in the art. Information regarding the term can be found, for example, in "Gas Turbine Combustion", by A. Lefebvre ($2^{nd}$ Edition), 1999, Taylor & Francis (e.g., at page 147), which is incorporated herein by reference. In the context of the present invention, a stable flame is one that does not extinguish due to lack of oxidizer, when the oxygen content ranges from about 20%-30% by volume in the oxidizer during operation of combustor, at a temperature within the range of about 2700° F. (1482° C.)-3700° F. (2038° C.). In other words, stable combustion can be maintained over a considerable range of fuel-oxidizer ratios. In one embodiment, the plasma generator 54 is operably incorporated into the combustor 14, so as to generate the plasma inside the combustor 14. A cooling system 16 can be fluidly coupled to combustor 14 by receiving the exhaust gas 62 produced by the combustor 14. In one embodiment, the cooling system 16 is fluidly coupled to the combustor 14 through a turbine 64. The turbine 64 may receive exhaust gas 62 from the combustor 14, and use at least a part of the energy associated with the exhaust gas 62 to generate electricity, releasing a used-up exhaust gas 66. Exhaust gas 66 from the turbine 64 may be passed through the cooling system 16, such as, for example, a water condensation system or HRSG, to condense water from the exhaust gas 66, and to create a carbon dioxide stream 70. The carbon dioxide stream 70 may be partially or fully captured in a $CO_2$ capture system 72, and stored. An amine $CO_2$ unit is a non-limiting example of a $CO_2$ capture system. In another embodiment, the carbon dioxide stream 70 may be directed to applications that use "high-content" carbon dioxide, such as for example, an oil recovery system 74. In another embodiment, at least a part of the carbon dioxide stream 70 is redirected to the combustor 14, after optional compression in a $CO_2$ compressor 76, to be mixed with the oxygen.

It is usually desirable to direct compressed oxygen to the combustor 14 to be mixed with fuel to maintain a minimum pressure of the reactant stream to the combustors. The compressed oxygen may be obtained in different ways. For example, in FIG. 3, the air is passed through the ASU 12, and separated oxygen is compressed through the oxygen compressor 78, before being directed to the combustor 14. In another embodiment, as shown in FIG. 4, air is compressed in an air compressor 80 before being supplied to an ASU 12. (The ASU is usually one that is capable of separating compressed oxygen from compressed air). Alternatively, an oxygen compressor 78 (e.g., see FIG. 3) may be added to the system explained in FIG. 4.

In other embodiments, a method of generating energy in a power plant that includes a gas turbine is provided. The method includes operating an ASU 12 (FIG. 4) to separate oxygen from air, passing fuel to the combustor 14, providing compressed oxygen to the combustor 14 by using air compressor 80 and/or oxygen compressor 78 (FIG. 3), and combusting the fuel stream 58 in the combustor 14, in the presence of oxygen. In this manner, an exhaust gas 62 is generated, comprising carbon dioxide and water. The exhaust gas 62 of the combustor 14 may be used in operating the turbine 64, e.g., to generate electricity. The exhaust gas 66 of the turbine 64 can be passed through a water condensation system 16 to separate water from the exhaust gas 66, and to produce a high-content carbon dioxide stream 70. The high-content carbon dioxide stream 70 is substantially free of oxygen, for safety considerations in those situations where the presence of oxygen is a serious concern. As explained above, the carbon dioxide stream 70 may be stored, directed to other applications, and/or compressed and fed back to the combustor 14, e.g., in combination with the compressed oxygen.

Initially, the flame inside the combustor 14 is usually stabilized with oxygen, and slowly, the carbon dioxide is introduced as an addition to the oxygen. Plasma power is usually switched on at low power, and plasma is introduced inside the combustor 14 while the $CO_2$ flow rates are still relatively low. In this manner, the $CO_2$ concentration in the combustor 14 feed can be maintained at less than about 70 volume percent. Gradually the $CO_2$ level in the oxidizer is increased and adjusted to be at a level that is capable of extinguishing the flame. Correspondingly, the power level of the plasma is increased and adjusted to stabilize the flame at that particular $CO_2$ level. Thus, the $CO_2$ rate is increased to levels exceeding 70% of the volume of oxidizer present, and the plasma power is correspondingly increased until a continuous operating plasma power level is attained.

The "operating power level" of the plasma is determined by the required flame temperature in the combustor 14. The oxygen percentage in the oxidizer at the required flame temperature provides a determination of the recirculated $CO_2$ volume flow rate to the combustor 14. By the application of plasma inside the combustor 14, a stable flame can be maintained at a carbon dioxide level greater than about 70 volume percent. In other words, the flame can be stabilized inside the combustor 14 at an oxygen level less than about 30 volume percent. Moreover, in some embodiments, the addition of plasma assists in maintaining a stable flame temperature inside the combustor 14 (FIG. 4). The use of the plasma is sometimes referred to herein as simply the "plasma assist".

EXAMPLES

The following examples illustrate methods, materials and results, in accordance with specific embodiments, and as such should not be construed as imposing limitations upon the claims. All components are commercially available from common chemical suppliers, unless otherwise indicated.

Experimental Setup

Figure 5:
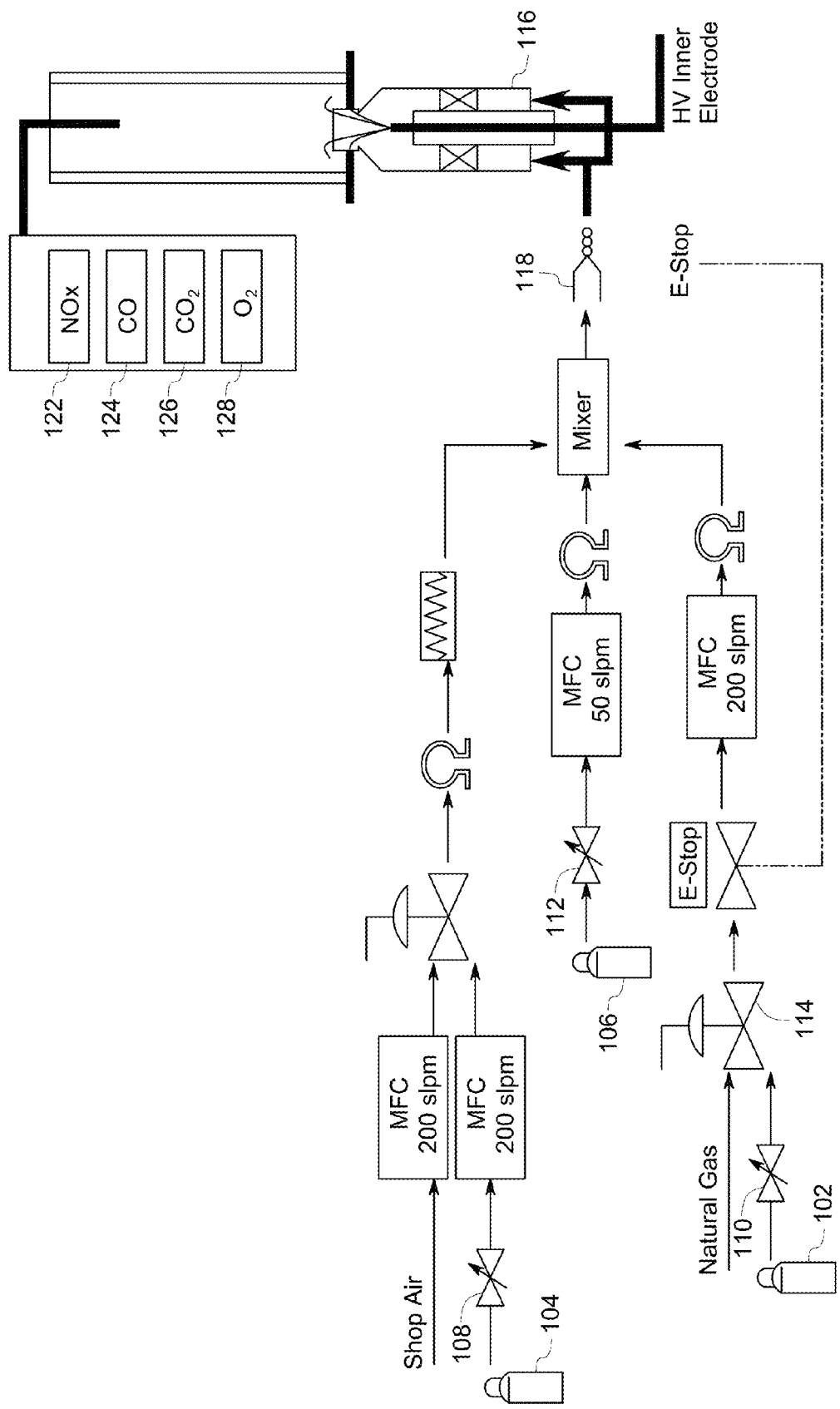
FIG. 5 illustrates an experimental system for evaluating oxy-fuel combustion in the presence of plasma.

FIG. 5 illustrates an experimental setup used for the study of oxy-fuel combustion in the presence of plasma. Gas cylinders 102, 104, and 106 are used to provide the $CH_4$ fuel, as well as the $O_2$ and $CO_2$ for the oxy-fuel oxidizer. For pressure and for flow control, mass flow regulators 108, 110, and 112 were incorporated downstream of the gas supply cylinders.

The oxidizer supply in $CH_4$— oxy configurations was preheated to nominal temperatures of about 650° F. (343° C.). For oxy-fuel flames, preheating is accomplished with the shop air supply to the required temperature. A selector valve 114 illustrated on the air/$CO_2$ line in FIG. 5, switches to the appropriate oxidizer, prior to combustion, to minimize $CO_2$ usage.

The fuel and oxidizer are premixed upstream of a swirl burner 116, illustrated in FIG. 5. A thermocouple 118 rated to 1000° F. (538° C.) was used to determine the incidence of flashback at lower effective jet velocities (Ue). The flashback thermocouple 118 is also tied to the E-Stop circuit to shut-off the fuel supply if a flashback event is detected. The burner 116 centerbody and the outer wall burner annulus are utilized as the HV electrodes. An AC power supply (10-30 KHz) capable of up to 50 kV (100 kV) peak to peak voltage, was used. About 4-10 kV power was used for the gliding arc plasma employed in the present study, due to the low densities. The voltages and current are measured to determine the average power used as an indicator of the plasma strength for various flame configurations. The gliding arc plasma system employed in the study was rated for a maximum average power of about 300 W.

Exhaust gases were examined via California Analytical Instruments $NO_x$ 122, CO 124, $CO_2$ 126 and $O_2$ 128 gas analyzers. The samples were collected with a water-cooled probe at the burner 116 tube exit. The quartz burner tube had a diameter of about 1.38 inch (3.50 cm), and a total length of 12 inches (30.48 cm). The burner assembly, including the mass flow meters, premixer, swirler and quartz tube, were mounted in a plexiglass enclosure located under an exhaust hood, to vent the combustion products.

Experiments conducted by the inventors were directed at determining the minimum $O_2$% (volume) for stable stoichiometric ($\phi$=1) oxy-fuel combustion with plasma; determining the effect of plasma power on emissions in oxy-fuel combustion; evaluating exhaust $O_2$ levels in oxy-fuel combustion, relative to equilibrium estimates; and obtaining the lean blow off (LBO) turndown benefits associated with plasma stabilization.

Table 1 shows the test conditions used for oxy-fuel combustion, using $CH_4$ as fuel at an oxygen temperature of about 650° F. (343° C.), and a fuel temperature of about 75° F. (24° C.) and ($\phi$=1.

TABLE 1

| $CH4$—($O_2$ + $CO_2$) test conditions | | | | | | | |
|---|---|---|---|---|---|---|---|
| $O_2$ Level (%) | 30.00 | 28.00 | 26.00 | 24.00 | 22.00 | 20.00 | 18.00 |
| Volume of $O_2$ ($^a$SLPM) | 21.52 | 19.96 | 18.43 | 16.91 | 15.41 | 13.93 | 12.46 |
| Volume of $CO_2$ (SLPM) | 50.20 | 51.33 | 52.45 | 53.55 | 54.64 | 55.72 | 56.78 |
| Volume of $CH_4$ (SLPM) | 10.76 | 9.98 | 9.21 | 8.46 | 7.71 | 6.96 | 6.23 |
| Temperature of flame (° C.) | 1986 | 1930 | 1867 | 1797 | 1718 | 1630 | 1531 |
| Velocity of products (m/s) | 5.9 | 5.7 | 5.4 | 5.1 | 4.8 | 4.5 | 4.2 |
| Residence time of products (ms) | 18.21 | 19.05 | 19.99 | 21.06 | 22.30 | 23.75 | 25.47 |
| TOTAL SLPM | 82.48 | 81.27 | 80.09 | 78.92 | 77.76 | 76.61 | 75.48 |

$^a$Standard liter per minute.

The nominal velocity at the burner exit (Ue) for each flame condition is determined using the relationship:

$$U_e(\text{ft/s}) = m_p/\rho_p A_p \quad (1)$$

The subscript "p" refers to the properties of the combustion products, m is mass flow rate, and $\rho$ is the density of combustion products. The cross-sectional area of the quartz burner tube is represented by $A_p$. For a characteristic combustion length scale (i.e. representative flame length) lc, the residence time ($\tau$) of reactants in the burner tube, associated with the nominal velocity, is estimated by:

$$\tau(ms)=1000(U_e/l_c) \quad (2)$$

The plasma power was varied, using the frequency of the voltage signal. A gliding arc plasma design was utilized. The voltage rated for the gliding arc plasma was 30 kV at 10 mA. The high voltage (HV) electrodes in the burner center body and annulus wall were rated to 40 kV.

Figure 6:
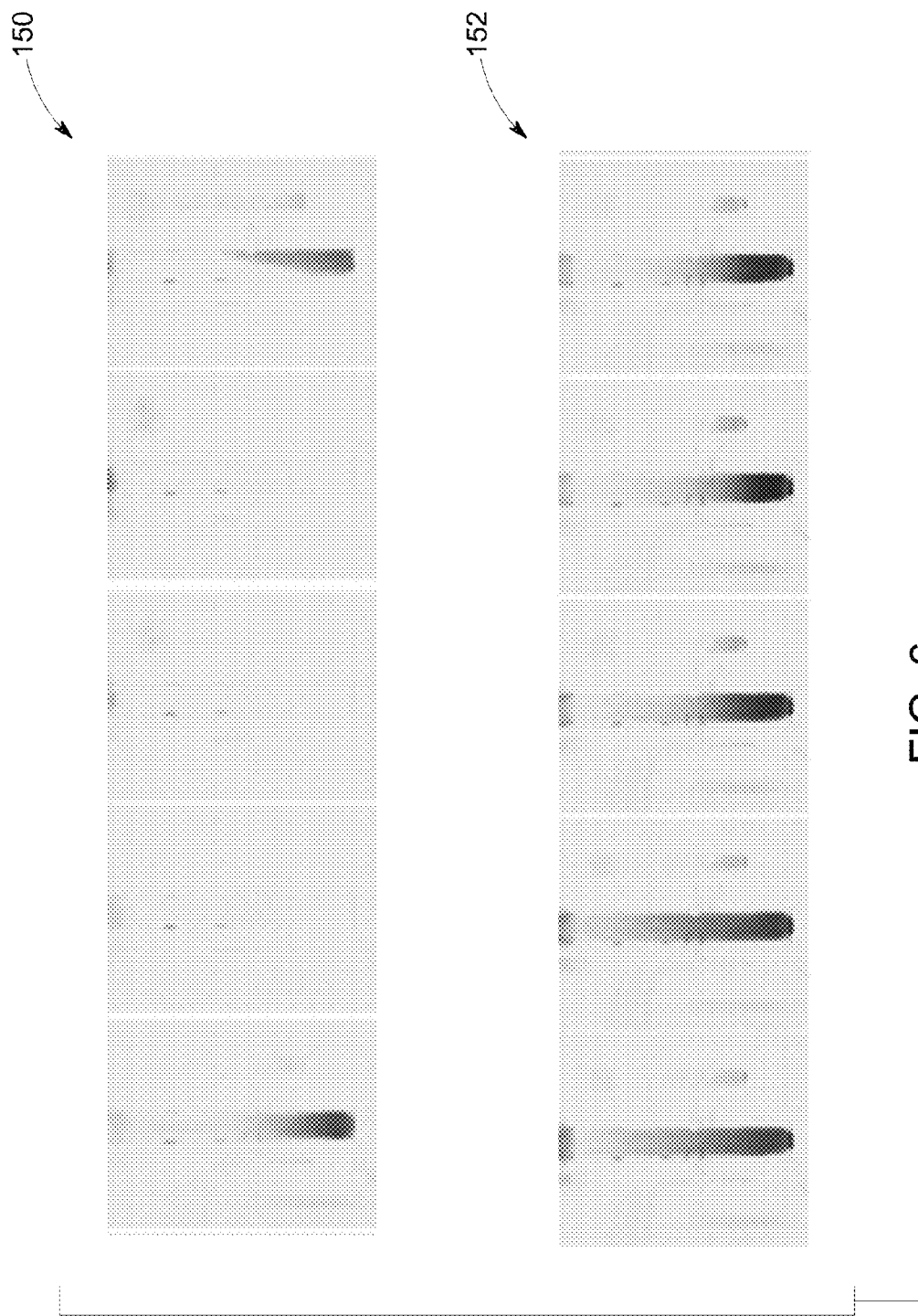
FIG. 6 represents flame images for $CH_4$-oxy combustion systems, under plasma or non-plasma conditions.

A sequence of flame images illustrating the significant changes in flame shape, due to combustion dynamics of $CH_4$-oxy combustion at the 2300° F. (1260° C.) condition, were observed, as shown in FIG. 6. The "combustion dynamics" refers to significant flame shape and noise variations due to pressure oscillation in unstable flames. In FIG. 6, the flame 150 that was not plasma-assisted was observed to periodically extinguish because of the $CH_4$-oxy combustion dynamics. The introduction of plasma was shown to result in a more stable flame 152 geometry, and hence, reduced the effect of combustion dynamics on flames. The time sequence of images of flames vividly demonstrated high amplitude flame dynamics in the absence of plasma, compared with the flame after the introduction of plasma. An enhanced stability in oxy-fuel flames was observed—even at $O_2$ levels capable of combustion without plasma. The introduction of plasma was observed to yield a more compact flame with increased stability.

As alluded to previously, the determination of the minimum oxygen level ($O_2$%) required in the oxidizer, for stable combustion, is very advantageous. Thus, the contribution of plasma stabilization toward extending the lower limit of stable oxy-fuel combustion was examined. Two qualitative categories of $CH_4$-oxy ($CO_2$—$O_2$) flames were investigated, including "High-Dynamics" and "Low Dynamics" flames. The high dynamics (HD) flames were obtained by changing the orientation of the upstream valve on the burner supply line, to induce pressure oscillations that propagate to the burner. The resulting flames were highly dynamic, audibly louder and characterized by larger pressure oscillations. The low dynamics flames (LD) obtained by altering the upstream mixer valve orientation were audibly quieter and characterized by lower oscillation amplitudes, indicating more stability.

Figure 7:
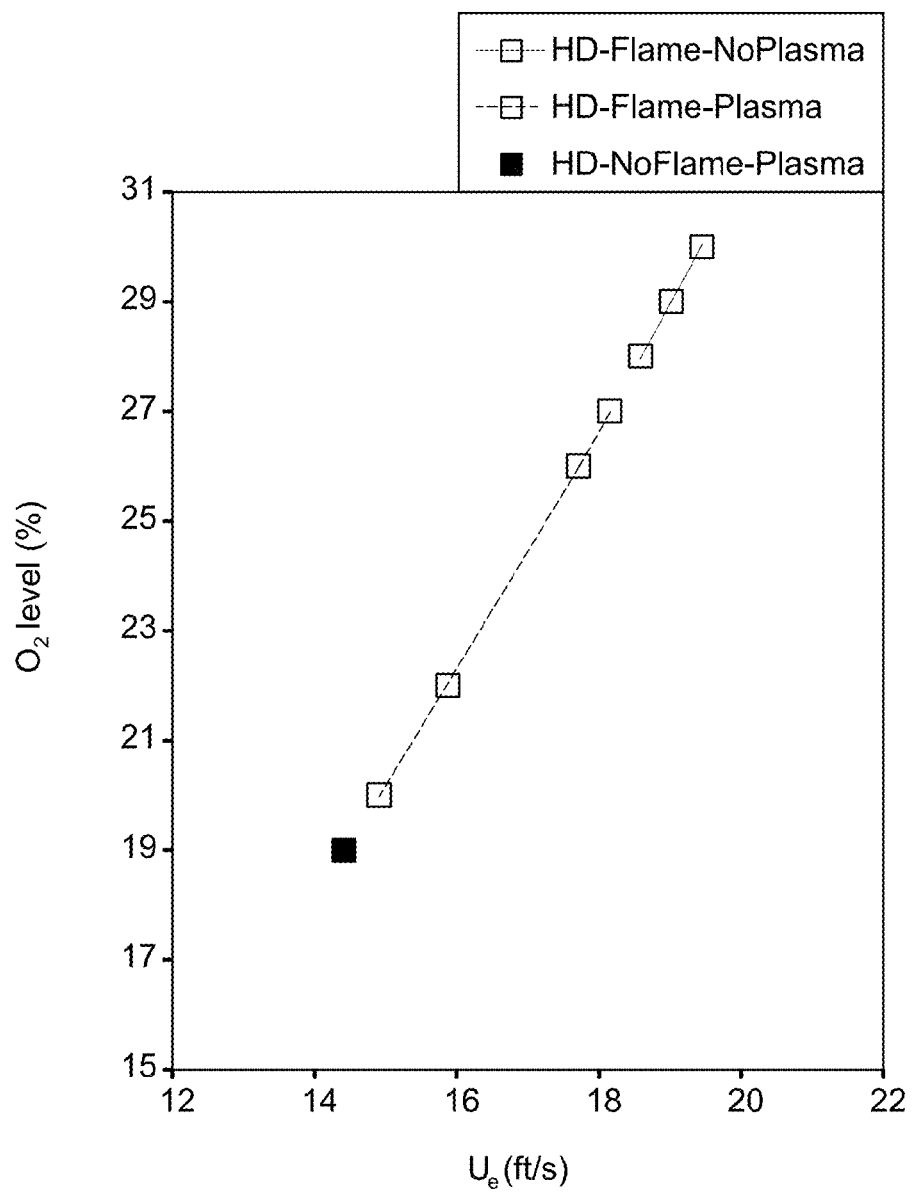
FIG. 7 is a graph representing required oxygen levels for stable combustion with and without plasma as a function of nominal velocity of stoichiometric $CH_4$-oxy(oxidizer) reactant mixtures.

At stoichiometric level ($\phi=1$), FIG. 7 illustrates the reduction in required $O_2$% in the oxidizer, due to the plasma assist, as a function of burner effective velocity (Ue). In the absence of plasma, the minimum oxygen level required for stable combustion was 28% $O_2$ by volume in the high dynamics (HD) burner mode. Stable combustion could not be achieved below the 28% $O_2$ level in the HD mode. With the addition of plasma, stable combustion was obtained for oxidizers with 20.5% $O_2$. The introduction of plasma-assist resulted in a 7.5% reduction in the minimum $O_2$ required for stable combustion. In the experiments in this study, stable combustion was qualitatively defined as repeatable; and sustained combustion was characterized by well-defined flames. The plasma benefits in FIG. 7 were obtained for effective velocities of 15-19 ft/s (4.5-5.8 m/s), equivalent to residence times of 20-24 ms. It should be understood that an even greater reduction in the required oxygen levels may be obtained with further adjustment in plasma and combustion conditions or combustor design, based on the teachings of this invention.

Figure 8:
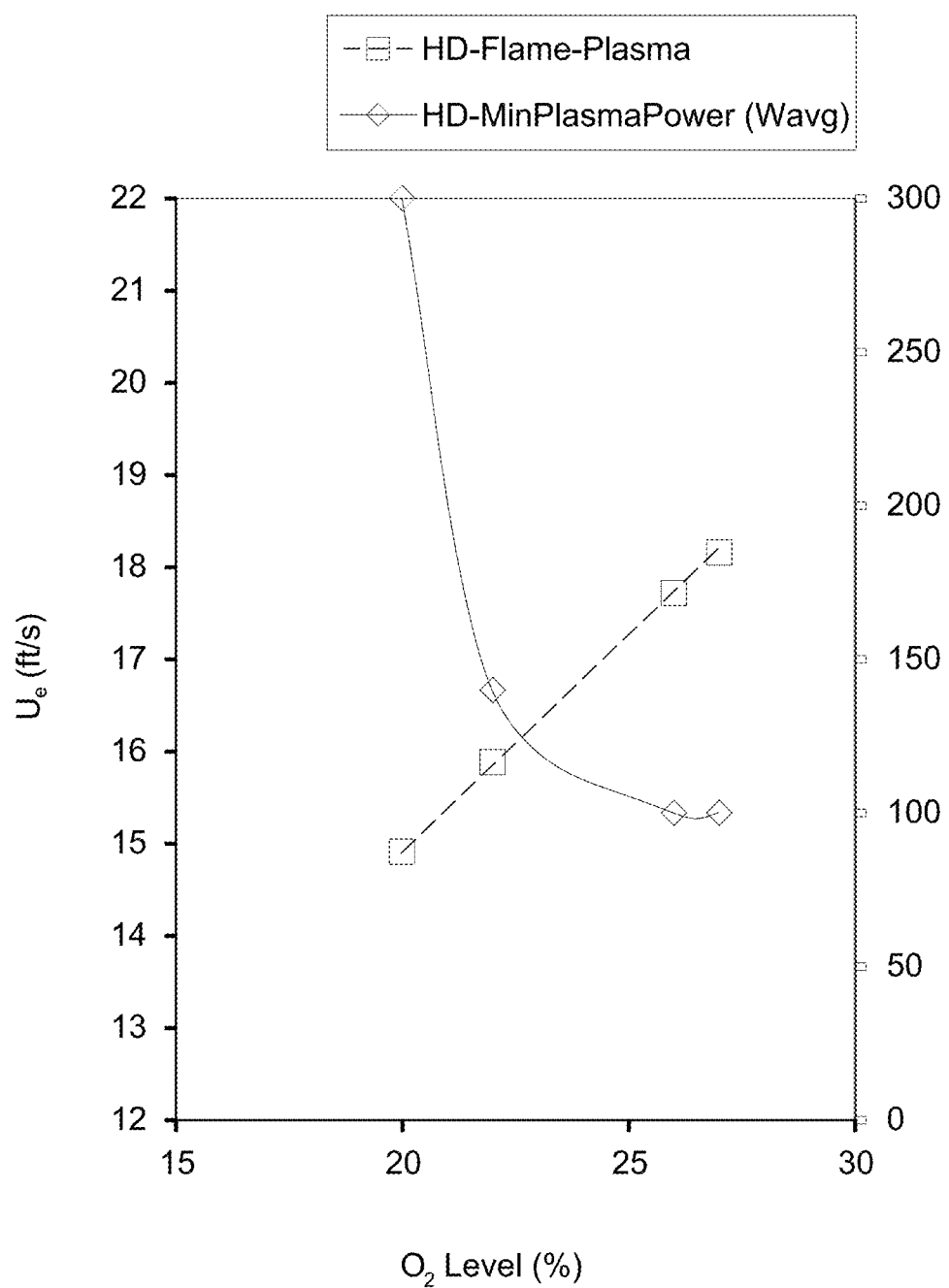
FIG. 8 is a graph representing plasma power ($W_{avg}$) required for stable combustion as a function of oxidizer oxygen concentration.

FIG. 8 illustrates the dependence of plasma stabilization benefits on the average plasma powers ($W_{avg}$) for the HD flame. In the high dynamics flame of FIG. 8, a maximum plasma power of close to 300 W was required to achieve stable oxy-fuel combustion at a 20.5% oxygen level. Exponentially decreasing plasma power was subsequently needed for higher $O_2$ levels.

The effect of increasing residence time was also explored by holding maximum plasma power, and reducing the effective jet velocity (Ue). However, no plasma benefits were obtained at lower residence times. The longest residence time investigated was 28.7 ms at 15% oxidizer $O_2$.

Plasma Effects on $CH_4$-Oxy Emissions

Figure 9:
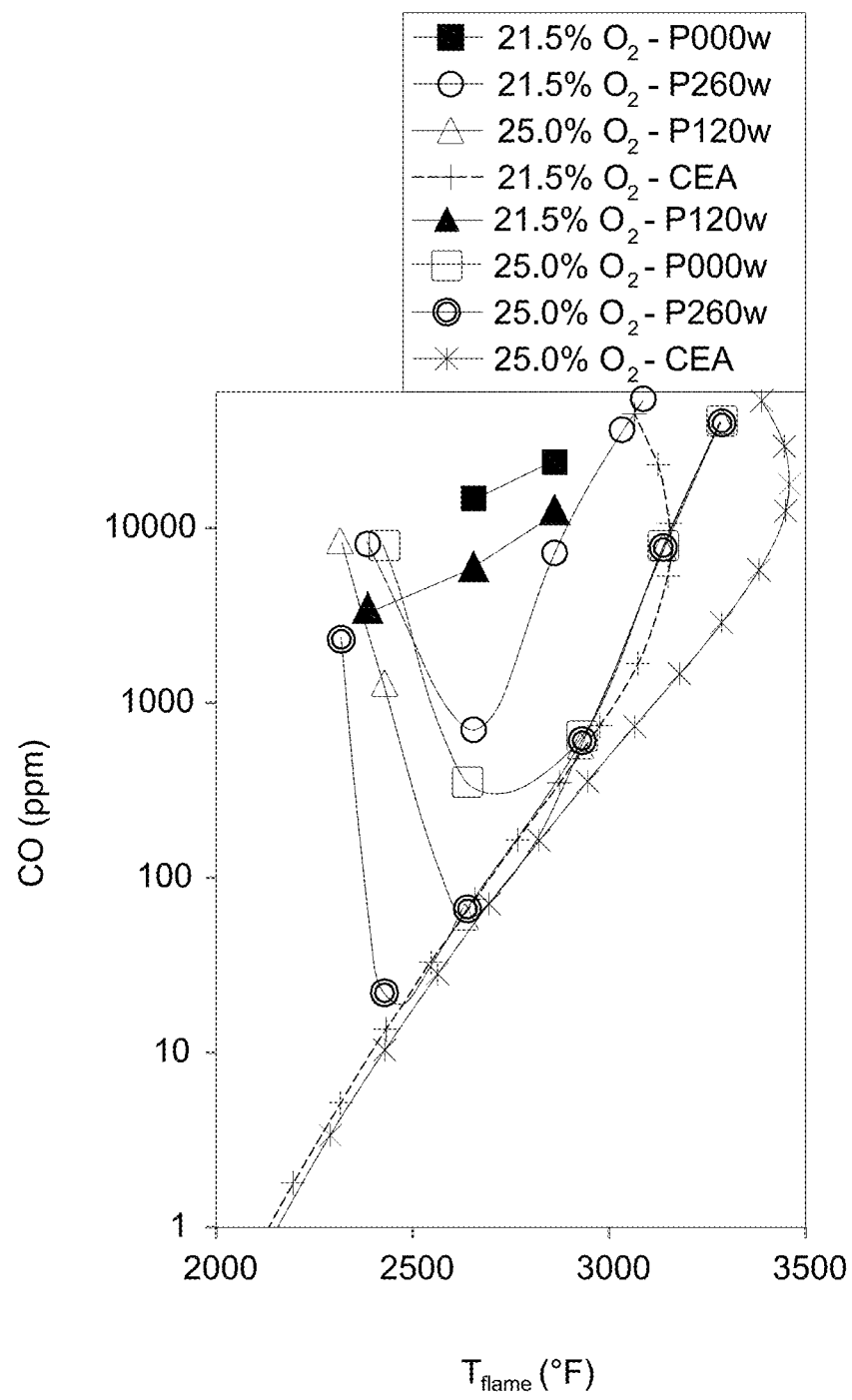
FIG. 9 is a graph representing carbon monoxide (CO) emissions, as a function of flame temperature, for an experimental system based on $CH_4$-oxy combustion.

CO is the primary pollutant of concern in oxy-fuel combustion, since only trace amounts of $N_2$ remain in the ($CO_2$—$O_2$) oxidizer from the ASU separation process. FIG. 9 illustrates the measurement of CO concentration in the exhaust gases from oxy-fuel combustion.

The impact of plasma on CO emissions was generally observed to be positive, as demonstrated, for example, in FIG. 9. CO emissions were reduced with increasing plasma power, with reductions of up to 14,000 ppm at 2650° F. (1455° C.). For the 25% $O_2$ flames, 20 ppm CO levels at 2400° F. (1315° C.) (matching) equilibrium are observed at the highest plasma level of 260 W. The agreement with equilibrium is found to improve with increasing plasma power—particularly for the 25% $O_2$ oxy-fuel flames.

Figure 10:
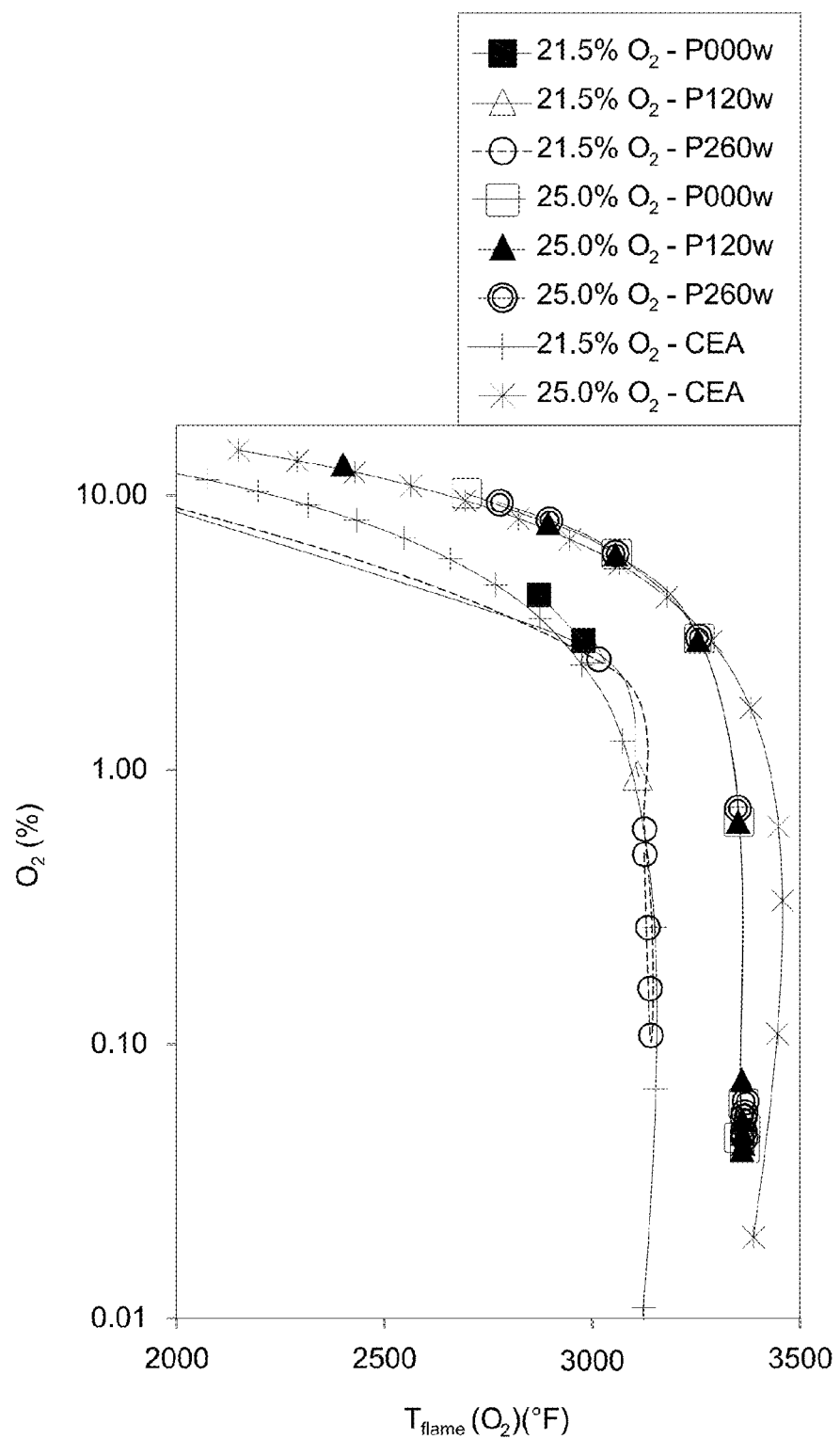
FIG. 10 is a graph representing flame oxygen emissions, as a function of flame temperature, for an experimental system based on $CH_4$-oxy combustion.
Figure 11:
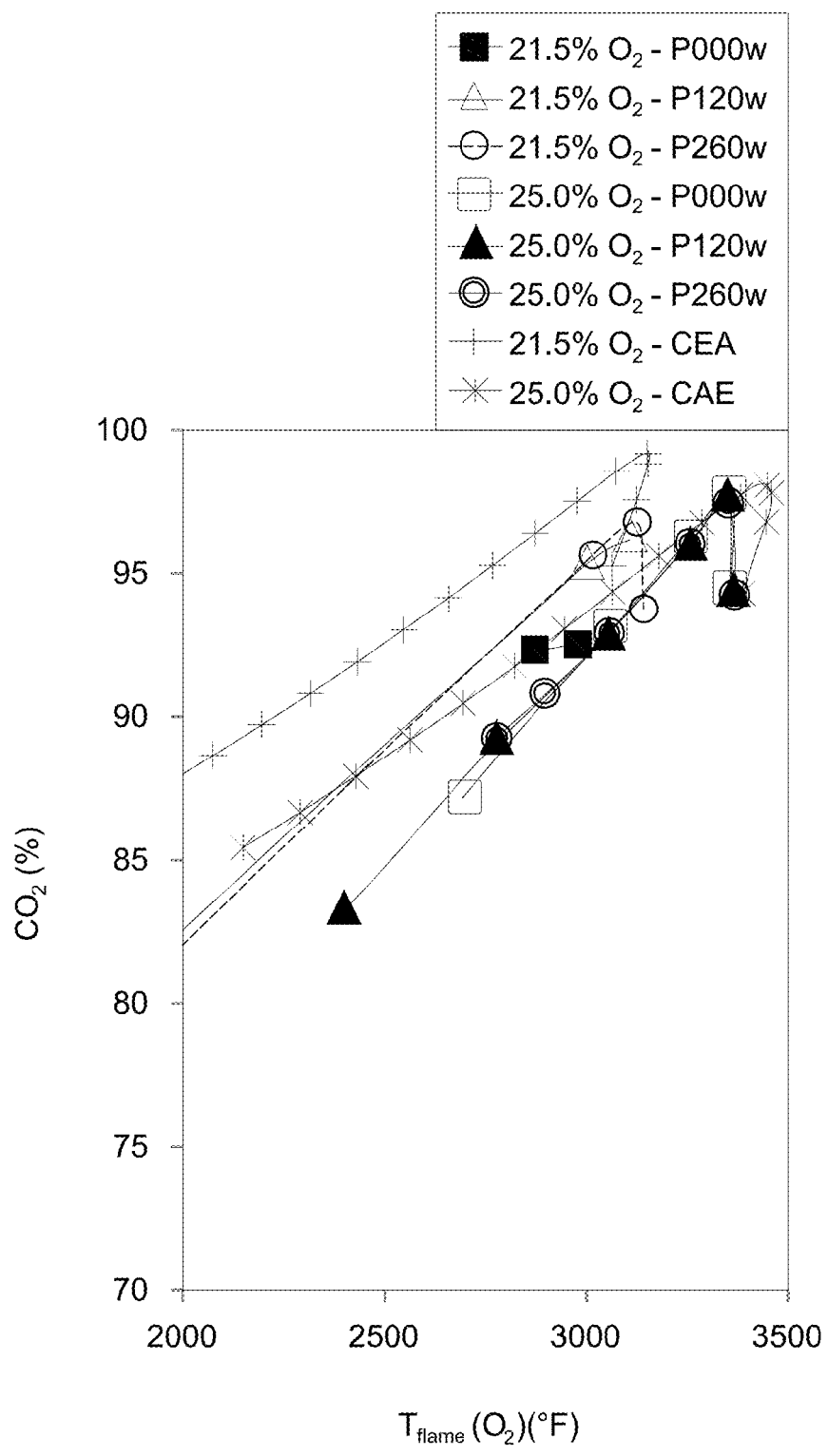
FIG. 11 is a graph representing carbon dioxide ($CO_2$) emissions, as a function of flame temperature, for an experimental system based on $CH_4$-oxy combustion.

The exhaust $O_2$ concentrations in the combustion products were generally lower than equilibrium predictions, as shown in FIG. 10, for both flame configurations. The level of exhaust-oxygen appears to be impacted by the increase in plasma power at the 21.5% $O_2$ oxy-fuel flame, with lower exhaust $O_2$ increasing with plasma power. The $CO_2$ emissions for 25% $O_2$ oxy-fuel flames in FIG. 11 were relatively independent of plasma power above 2500 F. (1371° C.). In contrast, the 21.5% $O_2$ flames are characterized by increasing $CO_2$, as the energy input from the plasma is increased. This result is consistent with the exhaust $O_2$ measurements at both oxygen levels in FIG. 10. Increasing plasma power reduced the CO emissions to approach equilibrium levels. This is accompanied by a reduction in exhaust $O_2$ levels (more complete combustion). The higher $CO_2$ levels in the combustion products demonstrate that increasing plasma power may be used to increase the efficiency of the downstream sequestration process, due to higher $CO_2$ concentrations in the exhaust gases.

A reduction in oxidizer $O_2$% level results in a reduction in the cost of an air separation unit (ASU) required for the $O_2$ supply. It also results in an increase in the fraction of exhaust $CO_2$ that can be recirculated for a practical combustion system. A third advantage of a lower $O_2$% requirement for stable combustion is the increase in the $CO_2$ purity in the exhaust gases which would result in an increased efficiency for downstream $CO_2$ sequestration technologies.

Reductions of up to about 7.5% in the minimum $O_2$% levels required for stable combustion were demonstrated for residence times of 20-24 ms at effective jet velocities of 15-20 ft/s (4.5-6.1 m/s). The benefits associated with plasma stabilization were observed to be strongly tied to the inherent dynamics of the combustion system. Higher benefits were demonstrated for combustor configurations with higher dynamics. For example, a 3.5% improvement (reduction) in required minimum oxidizer $O_2$% was observed with lower levels of combustion dynamics.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of generating energy in a power plant that includes a gas turbine, the method comprising:

operating an air separation unit to separate oxygen from air;

combusting a fuel stream in a combustor, in the presence of oxygen, so as to generate an exhaust gas comprising carbon dioxide and water;

operating a turbine, using the exhaust gas, to generate electricity;

condensing water out of the exhaust gas, after the exhaust gas is used to generate the electricity, so as to obtain a high-content carbon dioxide stream that is substantially free of oxygen;

directing at least a portion of the carbon dioxide stream to the combustor;

generating plasma inside the combustor, using a plasma generator; and maintaining a stable flame in the combustor at a carbon dioxide level of greater than about 70% of oxidizer composition by volume in the presence of plasma, by adjusting the carbon dioxide feed-rate; and the power level of the plasma.

2. The method of claim 1, comprising the step of maintaining a stable flame temperature at a carbon dioxide level of greater than about 70% of the oxidizer composition by volume.

3. The method of claim 1, further comprising the step of compressing air or oxygen, using a compressor.

4. The method of claim 3, wherein at least a portion of compressed air from the compressing step is directed to the air separation unit.

5. The method of claim 3, wherein the compressor receives oxygen from the air separation unit.

6. The method of claim 1, wherein at least a portion of the carbon dioxide stream is directed to an enhanced oil recovery system.

7. The method of claim 1, wherein the carbon dioxide portion is compressed before being directed to the combustor.

\* \* \* \* \*